US011512635B2

(12) United States Patent
Hunter et al.

(10) Patent No.: US 11,512,635 B2
(45) Date of Patent: Nov. 29, 2022

(54) GAS TURBINE WASTE HEAT UTILIZATION (71) Applicant: Halliburton Energy Services, Inc., Houston, TX (US)

(72) Inventors: Timothy Holiman Hunter, Duncan, OK (US); Glenn Howard Weightman, Duncan, OK (US); Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 298 days.

(21) Appl. No.: 16/583,558

(22) Filed: Sep. 26, 2019

(65) Prior Publication Data
US 2021/0095595 A1 Apr. 1, 2021

(51) Int. Cl.
*F02C 6/18* (2006.01)
*E21B 43/24* (2006.01)
*F28D 20/00* (2006.01)
*F02C 6/14* (2006.01)

(52) U.S. Cl.
CPC ............... *F02C 6/18* (2013.01); *E21B 43/24* (2013.01); *F02C 6/14* (2013.01); *F28D 20/00* (2013.01)

(58) Field of Classification Search
CPC .................. F01K 23/10; F02C 6/18
See application file for complete search history.

(56) References Cited

U.S. PATENT DOCUMENTS

| 7,888,294 | B2 | 2/2011 | Weinstein et al. | |
| 8,640,465 | B2* | 2/2014 | Corbett | F01K 13/00 60/775 |
| 9,435,175 | B2 | 9/2016 | Chong et al. | |
| 9,890,709 | B2 | 2/2018 | Klosinski et al. | |
| 2011/0308228 | A1* | 12/2011 | Freund | F28D 7/16 60/39.5 |
| 2012/0297667 | A1* | 11/2012 | Abel | C10J 3/00 44/307 |
| 2015/0035277 | A1* | 2/2015 | Brunhuber | F02C 6/04 60/39.5 |
| 2020/0166280 | A1* | 5/2020 | Nakamura | F28D 7/06 |

* cited by examiner

*Primary Examiner* — Gerald L Sung
(74) *Attorney, Agent, or Firm* — Conley Rose, P.C.; Rodney B. Carroll (57) ABSTRACT

At a well site, equipment will need a power source, such as a gas turbine, to operate. As the gas turbine operates, wasted energy in the form of heat is produced as a result of the efficiency of the gas turbine. With regards to the present disclosure, the heat may be used for operations and treatments at the well site. An embodiment of the present disclosure is a heat recovery system, comprising a gas turbine; a first heat exchanger, wherein the first heat exchanger is a finned-tube heat exchanger; and a second heat exchanger, wherein the second heat exchanger is a tube and shell heat exchanger, wherein the first heat exchanger is disposed in the flow path of an exhaust stream of the gas turbine, wherein the first heat exchanger is fluidly coupled to the second heat exchanger.

19 Claims, 6 Drawing Sheets

GAS TURBINE WASTE HEAT UTILIZATION

TECHNICAL FIELD OF INVENTION

The present disclosure relates to systems and methods for treating subterranean formations, and more particularly to systems and method for treating subterranean formations with heat recovered from a gas turbine.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Subterranean operations involve a number of different steps such as, for example, drilling a wellbore at a desired well site, treating and stimulating the wellbore to optimize production of hydrocarbons, and performing the necessary steps to produce and process the hydrocarbons from the subterranean formation.

Treating and stimulating a wellbore can include, among other things, delivering various fluids (along with additives, proppants, gels, cement, etc.) to the wellbore under pressure and injecting those fluids into the wellbore. One example treatment and stimulation operation is a hydraulic fracturing operation in which the fluids are highly pressurized via pumping systems to create fractures in the subterranean formation. The pumping systems typically include power sources that produce wasted energy in the form of heat.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present disclosure are described in detail herein. In the interest of clarity, not all features of an actual implementation are described in this disclosure. It will of course be appreciated that in the development of any such actual embodiment, numerous implementation specific decisions must be made to achieve developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

The terms "couple" or "couples" as used herein are intended to mean either an indirect or a direct connection. Thus, if a first device couples to a second device, that connection may be through a direct connection, or through an indirect mechanical or electrical connection via other devices and connections. The term "fluidically coupled" or "in fluid communication" as used herein is intended to mean that there is either a direct or an indirect fluid flow path between two components.

Figure 1:
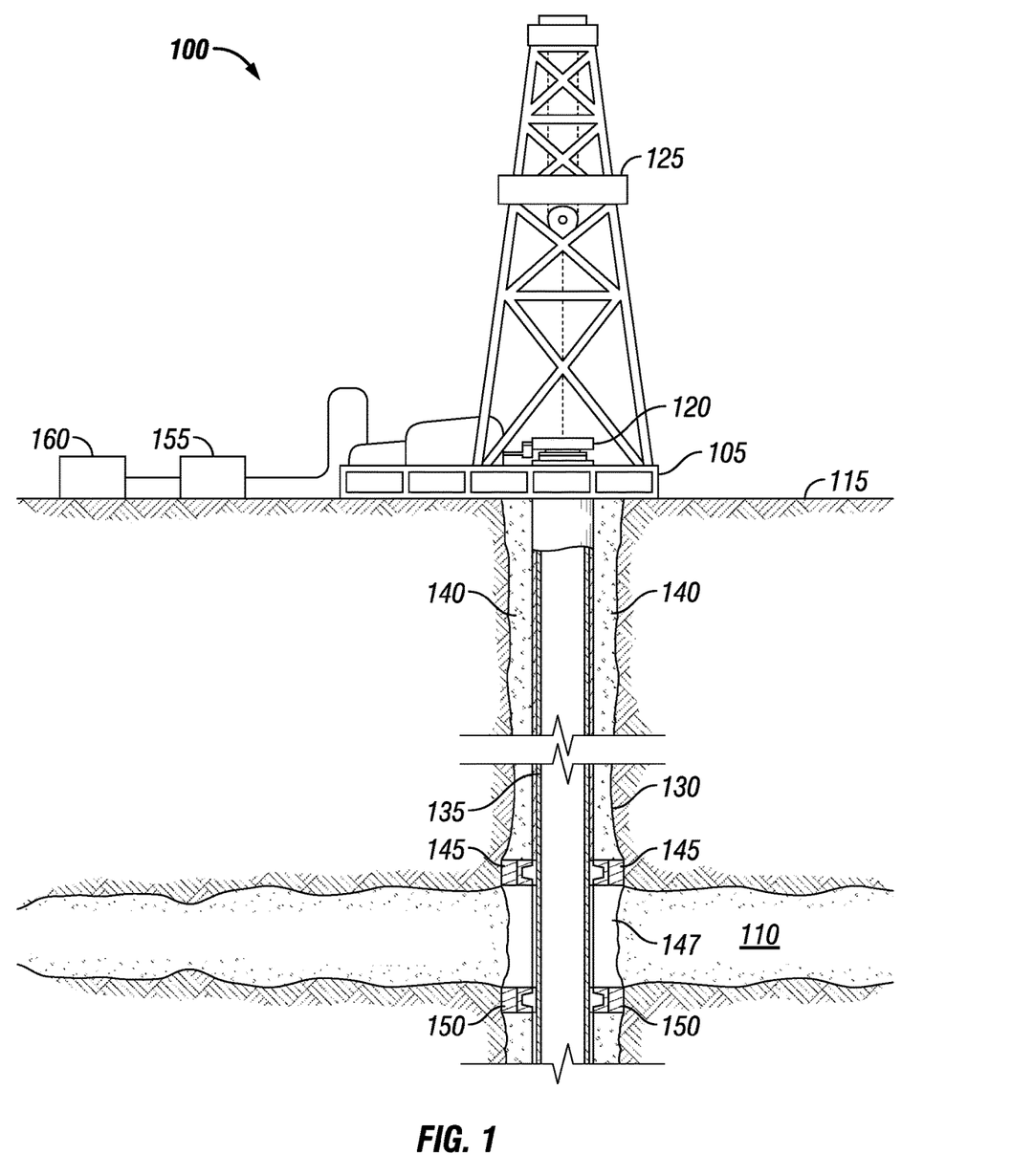
FIG. 1 illustrates a system for wellbore treatment and stimulation operations, in accordance with one or more embodiments of the present disclosure.

FIG. 1 illustrates a schematic diagram of a well stimulation system 100. Generally, well stimulation system 100 depicts a system for transferring material from a surface-located hydrocarbon well site 105. The well site 105 may be located over a hydrocarbon bearing formation 110, which is located below a ground surface 115. While well site 105 is illustrated at a ground surface 115, the present disclosure contemplates any one or more embodiments implemented at a well site at any location, including, at sea above a subsea hydrocarbon bearing formation. At certain times during the management and operation of the well stimulation system 100, the well site 105 may comprise a hoisting apparatus 120 and a derrick 125 for raising and lowering pipe strings such as a work string, drill string, or any other mechanism for deploying downhole tools, such as a bottom hole assembly, a drill bit, sensors, or any other device and combination thereof.

A wellbore 130 may be formed through various earth strata including the formation 110. A pipe or casing 135 may be insertable into the wellbore 130 and may be cemented within the wellbore 130 by cement 140. A first centralizer/packer device 145 may be disposed in an annulus 147 between the wellbore 130 and the casing 135 just above the formation 110, and a second centralizer/packer device 150 may be disposed in the annulus 147 between the wellbore 130 and the casing 135 just below the formation 110. A pump system 155, according to one or more aspects of the present disclosure, may be disposed at the surface 115 at or about the well site 105. The pump system 155 may be configured to provide power for one or more pumps, wherein the one or more pumps are configured to transfer, pump or flow material including but not limited to, water, linear gel, cross-linked gel, breaker, friction reducer, surfactant, biocide, sand, proppant, diverter, or any other stimulation fluid, and any combination thereof. In one or more embodiments, the pump system 155 may comprise any suitable equipment including, but not limited to, gearboxes, gear reducers, flanges, and pumps.

As illustrated, the pump system 155 may be coupled to a power source 160. Without limitations, the power source 160 may comprise one or more turbines, engines, motors, or any other suitable power source. The power source 160 may comprise an electric, diesel, gas (for example, natural gas), gasoline, wind, water, steam or any other suitable engine, motor or turbine for providing power to the pump system 155. In one or more embodiments, the power source 160 may be a turbine that provides power to at least one other piece of equipment at the well site 105 or the well stimulation system 100.

Figure 2:
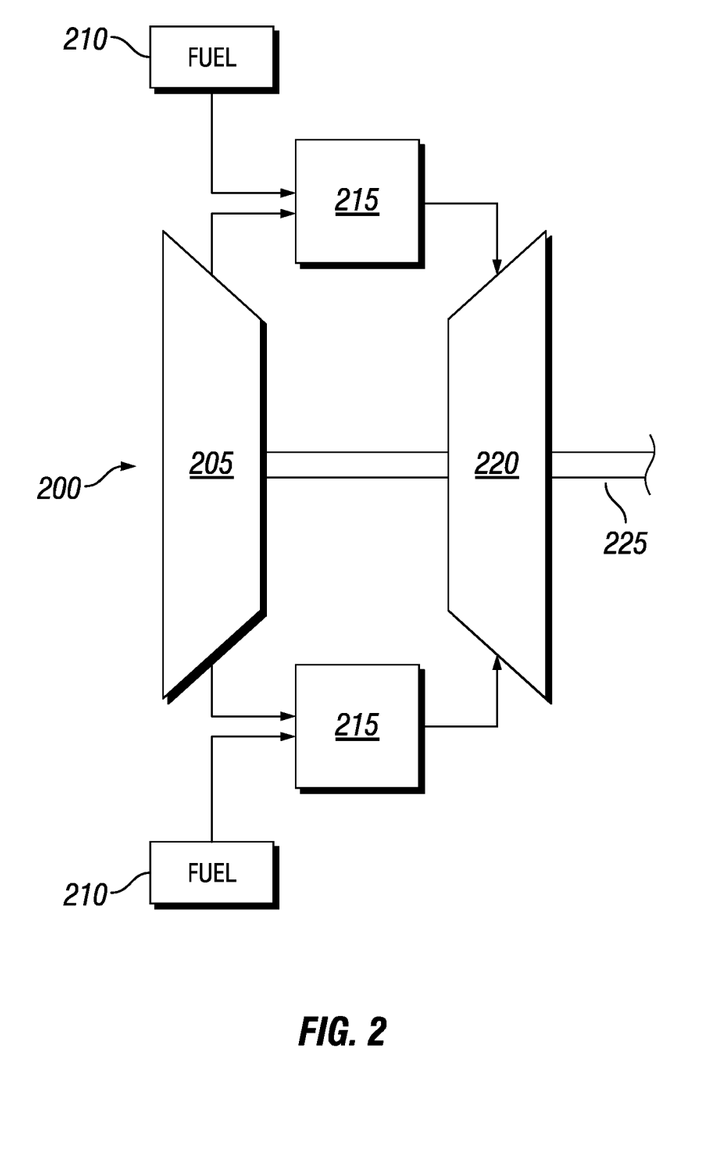
FIG. 2 illustrates a diagram of a gas turbine, in accordance with one or more embodiments of the present disclosure.

As used herein, the term "turbine" may generally refer to a gas turbine (for example, a turbine engine) that includes a compressor section, combustion section, and turbine section. An example gas turbine 200 is illustrated in FIG. 2. A compressor section 205 may intake and compress air to a higher pressure than the pressure of the air at intake. Fuel 210 may be injected into a combustion section 215 where the fuel 210 ignites with the compressed air to create a high pressure-high temperature gas that expands as it enters a power turbine section 220. Without limitations, such high temperature may be from about 1000° F. to about 2300° F. Without limitations, such high pressure may be from about 80 psi to about 160 psi. The power turbine section 220 may convert energy from the high pressure-high temperature gas into mechanical energy to rotate an output shaft 225.

Figure 3A:
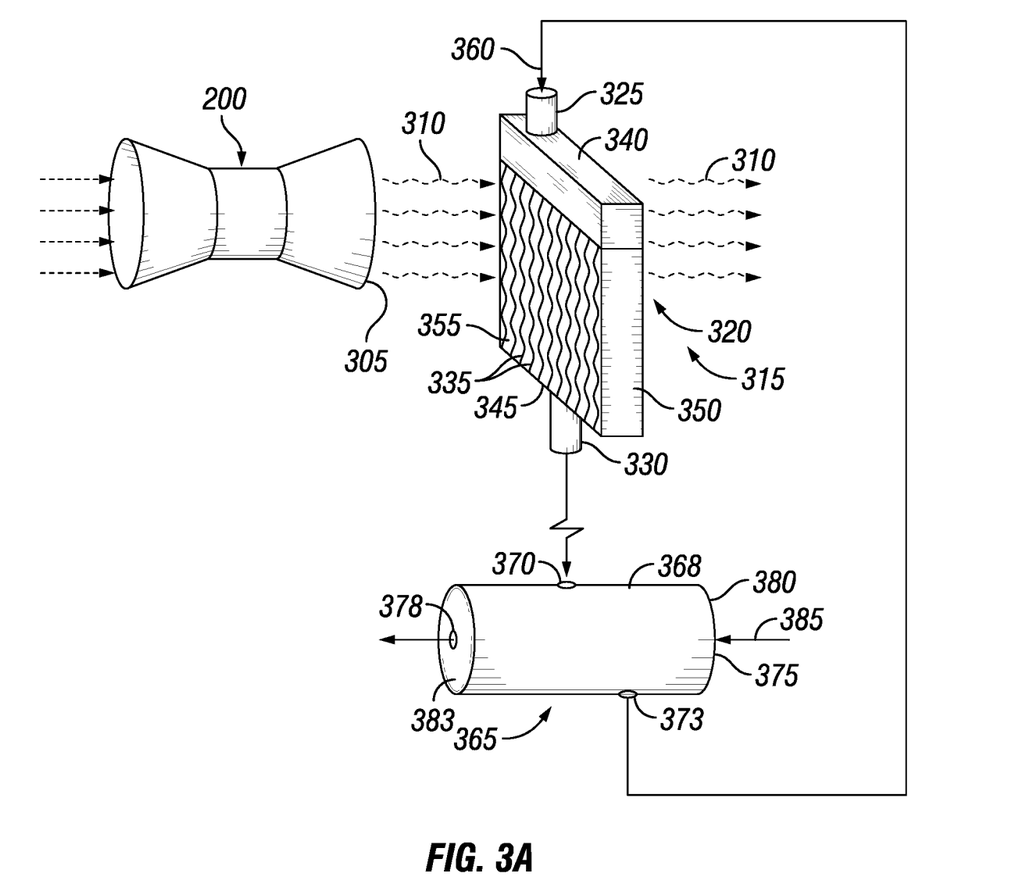
FIG. 3A illustrates a heat recovery system, in accordance with one or more embodiments of the present disclosure.

As gas turbine 200 operates, wasted energy in the form of heat may be produced as a result of the efficiency of the gas turbine 200. With regards to the present disclosure, the heat may be used for operations and treatments at the well site 105 (referring to FIG. 1). As illustrated in FIG. 3, gas turbine 200 may be incorporated into a heat recovery system 300. The heat recovery system 300 may be configured to utilize the heat produced by the gas turbine 200 to increase the temperature of a fluid. The fluid (for example, second fluid 385 described further below) may be used by well stimulation system 100 (referring to FIG. 1) to perform operations and treatments at or about the wellbore 130 (referring to FIG. 1).

As illustrated, heat may exit from the gas turbine 200 at a turbine outlet 305 as an exhaust stream 310, wherein the exhaust stream 310 comprises exhaust gases produced as a result of the combustion of fuel 210 (referring to FIG. 2). The turbine outlet 305 may be positioned so as to direct a flow of the exhaust stream 310 towards a first heat exchanger 315. Without limitations, any suitable type of apparatus capable of transferring heat between mediums may be used as the first heat exchanger 315. In other embodiments, means for utilizing radiation may be used with the present disclosure. In one or more embodiments, the first heat exchanger 315 may be a finned-tube (or "tube-and-fin") heat exchanger. Without limitations, other heat exchangers such as a flat-plate-fin heat exchanger, corrugated-plate-fin heat exchanger, bare-tube heat exchanger, and combinations thereof may be used as the first heat exchanger 315. While the exhaust stream 310 is illustrated as flowing through an open atmospheric environment, one skilled in the art may utilize suitable conduit or piping to direct the flow path of the exhaust stream 310.

The first heat exchanger 315 may comprise a first body 320, a first fluid inlet 325, a first fluid outlet 330, and a plurality of channels 335. The first body 320 may be any suitable size, height, and shape. In one or more embodiments, the first body 320 may comprise a first end 340, a second end 345, opposing side walls 350, and a central channel 355. As illustrated, the opposing side walls 350 may couple the first end 340 to the second end 345. The central channel 355 may be defined by the coupling of the opposing side walls 350 to the first end 340 and the second end 345. The central channel 355 may be an open bore within first body 320 between the opposing side walls 350, first end 340, and second end 345. The first fluid inlet 325 may be disposed at the first end 340, and the first fluid outlet 330 may be disposed at the second end 345. The plurality of channels 335 are coupled to the first fluid outlet 330 at the second end 330.

In one or more embodiments, a first fluid 360 may flow into the first body 320 of the first heat exchanger 315 through the first fluid inlet 325. Without limitations, the first fluid 360 may be any suitable fluid such as water, glycol, oil, fluids designed specifically for utilization with heat transfer, and combinations thereof. The first fluid inlet 325 may be coupled to the plurality of channels 335, wherein each one of the plurality of channels 335 is disposed between the first end 340 and the second end 345 within the central channel 355. The first fluid 360 may flow into and through the plurality of channels 335. As the first fluid 360 flows through the plurality of channels 335, the exhaust stream 310 may flow through and out of the central channel 355 of the first heat exchanger 315. In one or more embodiments, heat transfer may occur between the exhaust stream 310 and the first fluid 360 flowing through the plurality of channels 335, thereby increasing the temperature of the first fluid 360. The first fluid 360 flows through the plurality of channels 335 and out the first fluid outlet 330. In one or more embodiments, the first fluid 360 may flow into a second heat exchanger 365. While the first fluid 360 is illustrated as flowing through an open atmospheric environment, one skilled in the art may utilize suitable conduit or piping to direct the flow path of the first fluid 360.

Without limitations, any suitable type of apparatus capable of transferring heat between mediums may be used as the second heat exchanger 365. In one or more embodiments, the second heat exchanger 365 may be a tube and shell heat exchanger. The second heat exchanger 365 may comprise a second body 368, a first fluid inlet 370, a first fluid outlet 373, a second fluid inlet 375, and a second fluid outlet 378. The second body 368 may be any suitable size, height, and shape. In one or more embodiments, the second body 368 may generally be cylindrical with a first end 380 and a second end 383. As illustrated, the first fluid inlet 370 may be disposed about the second body 368 of the second heat exchanger 365, and the first fluid outlet 373 may be disposed about the second body 368 at a different location from the first fluid inlet 370. The second fluid inlet 375 may be disposed at the first end 380 of the second heat exchanger 365, and the second fluid outlet 378 may be disposed at the second end 383 of the second heat exchanger 365.

In one or more embodiments, the first fluid 360 may flow into the second body 368 of the second heat exchanger 365 through the first fluid inlet 370. As the first fluid 360 flows into the second heat exchanger 365, a second fluid 385 may flow into the second heat exchanger 365 through the second fluid inlet 375. Without limitations, the second fluid 385 may be any suitable well treatment fluid, such as water, oil, engine coolant, and combinations thereof. While not illustrated in FIG. 3A, it is to be understood that the flow paths of the first fluid 360 and the second fluid 385 are physically isolated from each other.

Figure 3B:
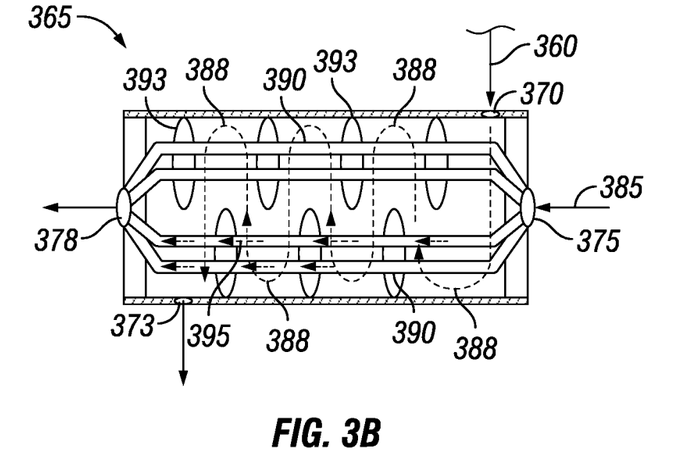
FIG. 3B illustrates a cross-section of a heat exchanger, in accordance with one or more embodiments of the present disclosure.

FIG. 3B illustrates a cross-sectional view of the second heat exchanger 365. As illustrated, a first flow path 388 is designated as the curved arrows flowing between a plurality of tubes 390 and a plurality of baffles 393 and may refer to the flow path of the first fluid 360. The plurality of baffles 393 may serve to hold the plurality of tubes 390 in place and to direct the first flow path 388. A second flow path 395 may be defined as the interior space confined within each one of the plurality of tubes 390 and may refer to the flow path of the second fluid 385. In one or more embodiments, the second fluid 385 may be introduced into the second heat exchanger 365 through the second fluid inlet 375. The second fluid 385 may be distributed in any suitable fashion to flow through the plurality of tubes 390 and out of the second heat exchanger 365 through the second fluid outlet 378. As the second fluid 385 is introduced into the second heat exchanger 365, the first fluid 360 may be introduced into the second heat exchanger 365 through the first fluid inlet 370. The first fluid 360 may follow the first flow path 388 to flow around the plurality of tubes 390 and the plurality of baffles 393. In one or more embodiments, heat transfer may occur between the first fluid 360 and the second fluid 385, thereby increasing the temperature of the second fluid 385 and decreasing the temperature of the first fluid 360. The first fluid 360 may then flow out of the first fluid outlet 373, and the second fluid 385 may flow out of the second fluid outlet 378. In one or more embodiments, first fluid outlet 373 may be coupled to first fluid inlet 325 to provide a closed-loop flow path for the first fluid 360, as best seen on FIG. 3A.

Figure 4A:
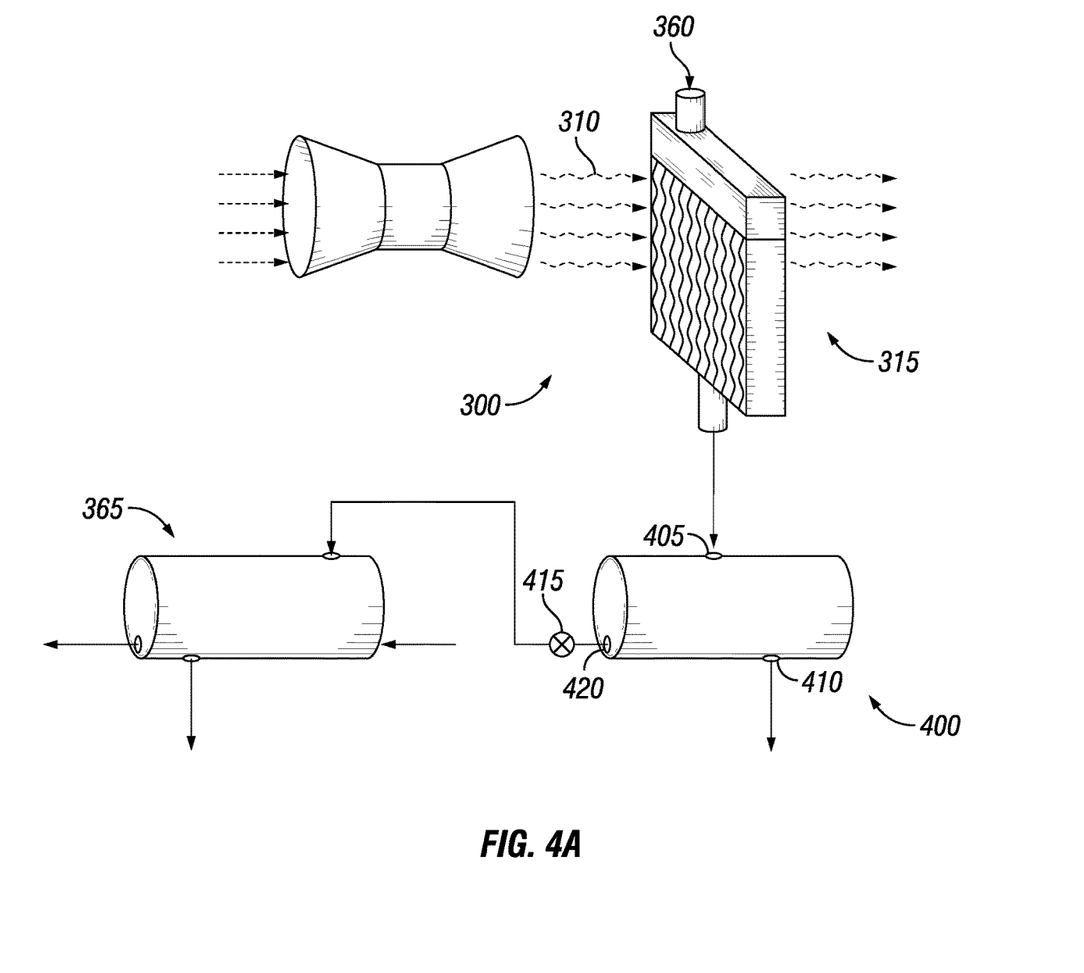
FIG. 4A illustrates a heat recovery system, in accordance with one or more embodiments of the present disclosure.
Figure 4B:
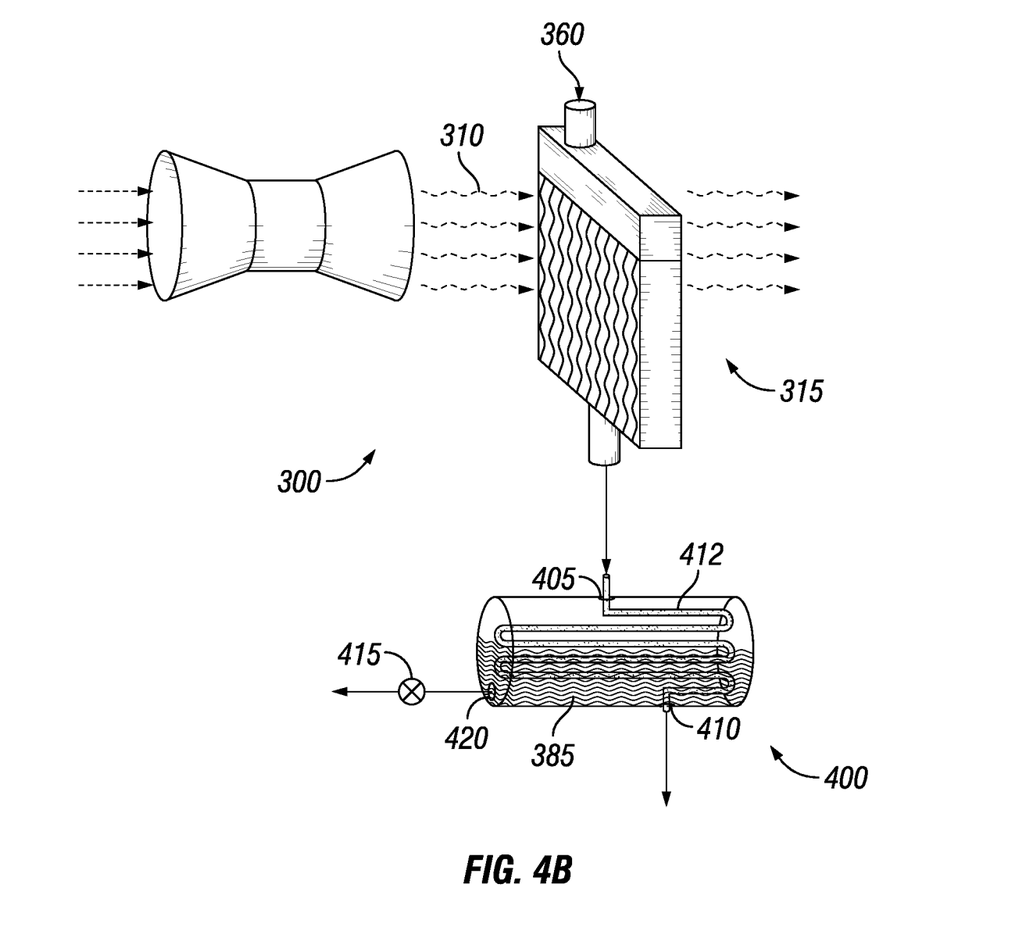
FIG. 4B illustrates a heat recovery system, in accordance with one or more embodiments of the present disclosure.

FIGS. 4A-4B illustrate a heat recovery system 300. In the present embodiment, rather than having the second heat exchanger 365 (referring to FIG. 3) downstream or at a distal end of the first heat exchanger 315, a thermal storage tank 400 may be coupled to the first heat exchanger 315. In embodiments, as shown in FIG. 4A, the thermal storage tank 400 may be used in conjunction with the second heat exchanger 365. In these embodiments, a third fluid (not shown) may be used to assist in the necessary heat transfer. In one or more embodiments, as shown in FIG. 4B, the second fluid 385 may be stored within the thermal storage tank 400 rather than introduced to flow through the second heat exchanger 365. Heat transfer may occur between the first fluid 360 and the second fluid 385 as the first fluid 360 flows into the thermal storage tank 400 at an inlet 405 and out of the thermal storage tank 400 at an outlet 410 while the second fluid 385 remains within the thermal storage tank 400. In these embodiments, the heat may transfer from the separated fluids through the enclosed flow path 412 coupled to inlet 405 and outlet 410. In embodiments, the enclosed flow path 412 may be any suitable size, height, shape, and combinations thereof for efficient heat transfer. As illustrated, the enclosed flow path 412 may comprise a serpentine shape. The temperature differential between the first fluid 360 and the second fluid 385 may cause heat transfer to occur between the two fluids as the first fluid 360 was previously heated by the exhaust stream 310, thereby increasing the temperature of the second fluid 385. The second fluid 385 may maintain its increased temperature by heating the thermal storage tank 400, continuing to flow the first fluid 360 through the thermal storage tank 400 to replace any heat lost by the second fluid 385, and combinations thereof. The second fluid 385 may be contained within the thermal storage tank 400 for a designated amount of time. In one or more embodiments, when an operation or treatment requires energy, the heated second fluid 385 may be discharged out of the thermal storage tank 400 after opening a valve 415 disposed at a second outlet 420 of the thermal storage tank 400 for utilization.

Figure 5:
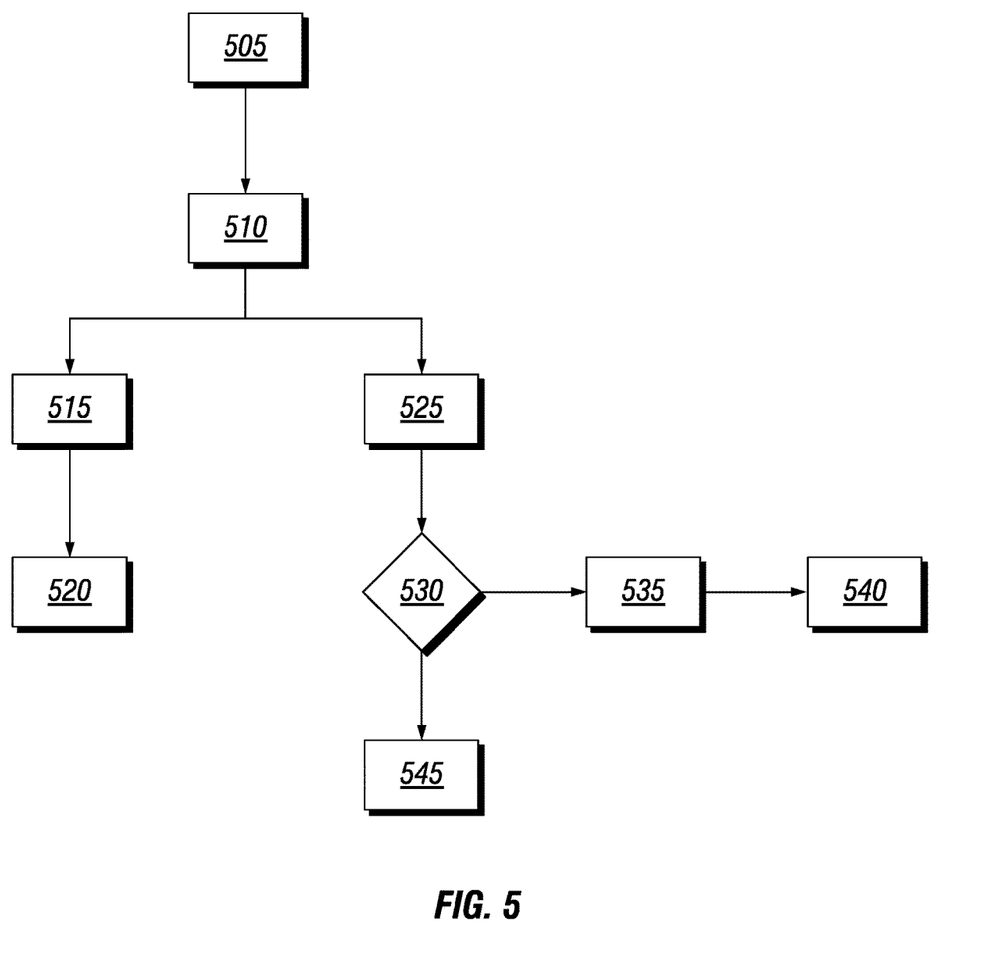
FIG. 5 illustrates a workflow for a heat recovery system, in accordance with one or more embodiments of the present disclosure.

FIG. 5 illustrates a workflow 500 for the heat recovery system 300 (referring to FIGS. 3 and 4). Step 505 may comprise of operating the gas turbine 200 (referring to FIG. 2). As the gas turbine 200 operates, heat in the form of exhaust stream 310 (referring to FIG. 3) may be produced. As disclosed, the exhaust stream 310 may be directed to the first heat exchanger 315 (referring to FIG. 3). Step 510 may comprise of flowing the first fluid 360 (referring to FIG. 3) through the first heat exchanger 315. As the first fluid 360 flows, heat transfer may occur between the exhaust stream 310 and the first fluid 360, thereby increasing the temperature of the first fluid 360. The first fluid 360 may exit the first heat exchanger 315 and be directed to either the second heat exchanger 365 (referring to FIG. 3) or the thermal storage tank 400 (referring to FIG. 4). If the first fluid 360 is directed to the thermal storage tank 400, step 515 may occur. Step 515 may comprise of flowing the first fluid 360 into the inlet 405 (referring to FIG. 4) and through the thermal storage tank 400. The second fluid 385 (referring to FIG. 3) may be contained within the thermal storage tank 400. As the first fluid 360 flows through the thermal storage tank 400 and out the outlet 410, heat transfer may occur, thereby increasing the temperature of the second fluid 385. When the second fluid 385 is needed for an operation, step 520 may occur, wherein step 520 comprises of actuating a valve of the thermal storage tank 400 in order to discharge the second fluid 385 out of the thermal storage tank 400.

If the first fluid 360 is directed to the second heat exchanger 365, step 525 may occur. Step 525 may comprise of flowing the first fluid 360 into first fluid inlet 370 (referring to FIG. 3) and through the second heat exchanger 365. Step 525 may also comprise of flowing the second fluid 385 into the second fluid inlet 375 (referring to FIG. 3) and through the second heat exchanger 365. In one or more embodiments, heat transfer may occur between the first fluid 360 and the second fluid 385, thereby increasing the temperature of the second fluid 385. Step 530 may be a decision step, wherein the subsequent method is dependent on whether or not the second fluid 385 is at or about a threshold temperature. In embodiments, the threshold temperature may be the boiling point, or the point of vaporization, of the second fluid 385. In these embodiments, an elevated pressure may also be used to increase the boiling point. If the second fluid 385 is at or about the threshold temperature, step 535 may occur. Step 535 may comprise of the second fluid 385 undergoing a phase change (for example, vaporization). The second fluid 385 may undergo a partial or complete phase change prior to step 540. Step 540 may comprise of utilizing the second fluid 385 in a well treatment. Without limitations, the well treatment may be carbon dioxide sequestration, fuel heating using liquified and/or compressed natural gas, steam production, degasification, and combinations thereof. If the second fluid 385 does not reach the threshold temperature, step 545 may occur. Step 545 may comprise of utilizing the second fluid 385 with an increased temperature for a well treatment. Without limitations, the well treatment may be fracturing, acidizing, drilling, clean-out, production fluid, and combinations thereof.

An embodiment of the present disclosure is a heat recovery system, comprising a gas turbine; a first heat exchanger, wherein the first heat exchanger is a finned-tube heat exchanger; and a second heat exchanger, wherein the second heat exchanger is a tube and shell heat exchanger, wherein the first heat exchanger is disposed in the flow path of an exhaust stream of the gas turbine, wherein the first heat exchanger is fluidly coupled to the second heat exchanger.

In one or more embodiments described in the preceding paragraph, wherein the first heat exchanger comprises a body, a fluid inlet, a fluid outlet, and a plurality of channels. In one or more embodiments described above, wherein the first body comprises a first end, a second end, a central channel, and opposing sidewalls, wherein the fluid inlet is disposed at the first end, and wherein the fluid outlet is disposed at the second end. In one or more embodiments described above, wherein the opposing sidewalls couple the first end to the second end, wherein the first end and the second end are disposed at opposing ends of the first body, wherein the central channel is an open bore defined by the opposing sidewalls, the first end, and the second end. In one or more embodiments described above, wherein the plurality of channels is disposed within the central channel, wherein each of the plurality of channels is coupled to the fluid inlet and the fluid outlet. In one or more embodiments described above, wherein the second heat exchanger comprises a first fluid inlet, a first fluid outlet, a second fluid inlet, and a second fluid outlet. In one or more embodiments described above, wherein the second heat exchanger comprises a plurality of tubes and a plurality of baffles, wherein the plurality of baffles is configured to secure the plurality of tubes in place within the second heat exchanger. In one or more embodiments described above, wherein the plurality of tubes are coupled to the second fluid inlet and the second fluid outlet. In one or more embodiments described above, the heat recovery system further comprising a thermal storage tank, wherein the thermal storage tank is disposed in between the first heat exchanger and the second heat exchanger.

Another embodiment of the present disclosure is a heat recovery system, comprising a gas turbine; a first heat exchanger, wherein the first heat exchanger is a finned-tube heat exchanger, wherein the first heat exchanger is disposed in the flow path of an exhaust stream of the gas turbine; and a thermal storage tank, wherein the first heat exchanger is fluidly coupled to the thermal storage tank.

In one or more embodiments described in the preceding paragraph, wherein the thermal storage tank comprises an inlet, a first outlet, a second outlet, and an enclosed flow path, wherein the enclosed flow path is coupled to the inlet and the first outlet. In one or more embodiments described above, the heat recovery system further comprising a valve disposed about the second outlet.

Another embodiment of the present disclosure is a method of utilizing waste heat, comprising operating a gas turbine, wherein the operation of the gas turbine produces heat in the form of an exhaust stream; flowing a first fluid into and through a first heat exchanger; flowing the first fluid into and through a second heat exchanger, wherein the first heat exchanger is fluidly coupled to the second heat exchanger; flowing a second fluid into and through the second heat exchanger; and utilizing the second fluid for a well treatment.

In one or more embodiments described in the preceding paragraph, the method further comprising flowing the first fluid through a thermal storage tank, wherein the thermal storage tank is disposed between the first heat exchanger and the second heat exchanger. In one or more embodiments described above, the method further comprising of actuating a valve disposed at an outlet of the thermal storage tank. In one or more embodiments described above, wherein the first fluid is water, glycol, oil, a fluid designed specifically for utilization with heat transfer, and combinations thereof. In one or more embodiments described above, wherein the second fluid is a well treatment fluid, water, oil, engine coolant, and combinations thereof. In one or more embodiments described above, wherein as the first fluid exits the first heat exchanger, the first fluid is at a higher temperature than when the first fluid enters the first heat exchanger. In one or more embodiments described above, wherein as the first fluid exits the second heat exchanger, the first fluid is at a lower temperature than when the first fluid enters the second heat exchanger. In one or more embodiments described above, wherein as the second fluid exits the second heat exchanger, the second fluid is at a higher temperature than when the second fluid enters the second heat exchanger.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A heat recovery system for recovering heat at a well site having a power source adjacent a well, comprising:
    a gas turbine comprised in the power source operable to produce heat in the form of an exhaust stream;
    a first heat exchanger operable to receive a first fluid, wherein the first heat exchanger is a finned-tube heat exchanger;
    a thermal storage tank, wherein the thermal storage tank is operable to:
        receive the first fluid from the first heat exchanger;
        store a third fluid; and
        discharge the third fluid; and
    a second heat exchanger, wherein the second heat exchanger is a tube and shell heat exchanger, wherein the second heat exchanger is operable to:
        receive the third fluid from the thermal storage tank;
        receive a second fluid at a first temperature; and
        discharge the second fluid at a second temperature for a well treatment of the well,
    wherein the second temperature is greater than the first temperature,
    wherein the first heat exchanger is disposed in the flow path of the exhaust stream of the gas turbine,
    wherein the first heat exchanger is fluidly coupled to the thermal storage tank,
    wherein the thermal storage tank is fluidly coupled to the second heat exchanger, and
    wherein the second heat exchanger is fluidly coupled to the well.

2. The heat recovery system of claim 1, wherein the first heat exchanger comprises a first body, a fluid inlet, a fluid outlet, and a plurality of channels.

3. The heat recovery system of claim 2, wherein the first body comprises a first end, a second end, a central channel, and opposing sidewalls, wherein the fluid inlet is disposed at the first end, and wherein the fluid outlet is disposed at the second end.

4. The heat recovery system of claim 3, wherein the opposing sidewalls couple the first end to the second end, wherein the first end and the second end are disposed at opposing ends of the first body, wherein the central channel is an open bore defined by the opposing sidewalls, the first end, and the second end.

5. The heat recovery system of claim 3, wherein the plurality of channels is disposed within the central channel, wherein each of the plurality of channels is coupled to the fluid inlet and the fluid outlet.

6. The heat recovery system of claim 1, wherein the second heat exchanger comprises a first fluid inlet, a first fluid outlet, a second fluid inlet, and a second fluid outlet.

7. The heat recovery system of claim 6, wherein the second heat exchanger comprises a plurality of tubes and a plurality of baffles, wherein the plurality of baffles is configured to secure the plurality of tubes in place within the second heat exchanger.

8. The heat recovery system of claim 7, wherein the plurality of tubes is coupled to the second fluid inlet and the second fluid outlet.

9. A method of utilizing waste heat at a well site having a power source adjacent a well, comprising: operating a gas turbine comprised in the power source, wherein the operation of the gas turbine produces heat in the form of an exhaust stream; flowing a first fluid into and through a first heat exchanger, wherein the first heat exchanger is a finned-tube heat exchanger; flowing the first fluid into and through a thermal storage tank, wherein the thermal storage tank stores a third fluid, and wherein the first heat exchanger is fluidly coupled to the thermal storage tank; flowing the third fluid into and through a second heat exchanger fluidly coupled to the thermal storage tank, wherein the second heat exchanger is a tube and shell heat exchanger and is operable to:
receive the third fluid from the thermal storage tank;
receive a second fluid at a first temperature; and
discharge the second fluid at a second temperature to the well for a well treatment, wherein the second temperature is greater than the first temperature, wherein the first heat exchanger is disposed in the flow path of the exhaust stream of the gas turbine.

10. The method of claim 9, further comprising actuating a valve disposed at an outlet of the thermal storage tank.

11. The method of claim 9, wherein the first fluid is water, glycol, oil, and combinations thereof.

12. The method of claim 9, wherein the second fluid is a well treatment fluid, water, oil, engine coolant, and combinations thereof.

13. The method of claim 9, wherein as the first fluid exits the first heat exchanger, the first fluid is at a higher temperature than when the first fluid enters the first heat exchanger.

14. The method of claim 9, wherein as the first fluid exits the thermal storage tank, the first fluid is at a lower temperature than when the first fluid enters the thermal storage tank and the third fluid is at a higher temperature than when the first fluid enters the thermal storage tank.

15. The method of claim 9, wherein as the third fluid exits the second heat exchanger, the third fluid is at a lower temperature than when the third fluid enters the second heat exchanger.

16. A heat recovery system for recovering heat at a wellsite adjacent a well, comprising:
a gas turbine operable to produce heat in the form of an exhaust stream, wherein the gas turbine is coupled to a power source located at the well site;
a first heat exchanger operable to receive a first fluid, wherein the first heat exchanger is a finned-tube heat exchanger;
a thermal storage tank, wherein the thermal storage tank is operable to:
receive the first fluid from the first heat exchanger;
store a third fluid; and
discharge the third fluid wherein heat transfer occurs directly between the first and third fluids; and
a second heat exchanger, wherein the second heat exchanger is a tube and shell heat exchanger separate from the thermal storage tank, wherein the second heat exchanger is operable to:
receive the third fluid from the thermal storage tank;
receive a second fluid at a first temperature; and
discharge the second fluid at a second temperature to the well for a well treatment, wherein the second temperature is greater than the first temperature,
wherein the first heat exchanger is disposed in the flow path of the exhaust stream of the gas turbine,
wherein the first heat exchanger is fluidly coupled to the thermal storage tank,
wherein the thermal storage tank is fluidly coupled to the second heat exchanger, and
wherein the second heat exchanger is fluidly coupled to the well.

17. The heat recovery system of claim 1, wherein heat transfer occurs directly between the first and third fluids.

18. The heat recovery system of claim 1, wherein the second heat exchanger is separate from the thermal storage tank.

19. The heat recovery system of claim 1, wherein the well site comprises a hoisting apparatus, a derrick, a pump system and a power source.

\* \* \* \* \*